INVENTORS
GEORGE R. SPIES
MARK P. HAFFNER
BY Edmund W Bopp

United States Patent Office 3,515,155
Patented June 2, 1970

3,515,155
GAS MIXTURE PROPORTIONER
Mark P. Haffner, East Orange, and George R. Spies, Murray Hill, N.J., assignors to Air Reduction Company, Incorporated, New York, N.Y., a corporation of New York
Filed Feb. 24, 1967, Ser. No. 618,371
Int. Cl. F17d 1/00; G05d 11/00; B67d 5/54
U.S. Cl. 137—7  41 Claims

ABSTRACT OF THE DISCLOSURE

This invention relates to the mixing of gas to obtain desired proportions of different gases; for use in chemical processes; and for supplying breathing atmospheres of different composition for divers at different depths. A supply line for each gas leads to a mixing chamber. There are metering valves, of different capacities, connected in parallel in each supply line. By using different combinations of metering valves in the supply lines, various mixtures can be obtained. Back pressure on the metering valves is maintained at a constant value. An accumulator, in parallel with a delivery line, can be dumped before changing mixture proportions, or at any time without dropping the pressure in the delivery line.

SUMMARY OF THE INVENTION

This invention provides a system for mixing different gases in controlled proportions. It will be described in apparatus for supplying a breathing atmosphere to a diver and for changing the proportions of the different constitutents of the atmosphere as the depth of immersion of the diver changes.

The invention has a supply line for each gas, and has a plurality of metering valves, connected in parallel with one another, in each supply line. By using different combinations of metering valves which have different capacities, and shutting off the others, the rate of flow through the different supply lines is controlled to obtain the desired proportions at a mixing chamber.

In the preferred construction, a back pressure on the downstream side of the metering valves is maintained, to keep the lower metering pressure constant. Provision is made to have the pressure upstream of all of the metering valves vary by the same pressure change if it varies in any one line. The pressure drop across the metering valves is substantally independent of the demand so as to keep the proportions of the different gases constant.

When gas is flowing from the supply lines, it is at a rate greater than the maximum demand for which the system is intended. Pressure builds almost instantaneously in the delivery line and when it reaches a predetermined value, some of the flow is admitted into an accumulator tank. Shutoff valves stop further supply of gas when the pressure in the accumulator rises to a certain value, and the gas supply lines are again turned on when the pressure in the accumulator drops below a predetermined value. When gas proportions are to be changed and it is desirable that the change be effected promptly at the downstream end of the delivery line, the accumulator can be dumped to the atmosphere through a discharge line, and there are valves for preventing the loss in pressure in the accumulator from dropping the pressure in the delivery line.

In the preferred construction, the apparatus meters subscritically between fixed pressure limits at all times and thereby avoids mixture variations that would occur if the mixing chamber pressure were allowed to vary with accumulator pressure. Such variation would be caused by the effects of differences in specific heats of the monatomic and diatomic gases and by the nonideality of the gases being mixed.

The importance of using sub-critical flow between fixed pressure limits is that it is the preferred alternative to a critcial flow scheme. In a critical flow scheme, the downstream pressure would not have to be fixed as long as it were below approximately one-half of the upstream pressure at all times. Sub-critical flow is preferred here because it allows upstream pressure to be significantly lower than in a comparable critical flow scheme for the same outlet pressure requirement. Thus, a greater portion of the supply tank capacity can be utilized.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DETAILED DESCRIPTION

Figure 1:
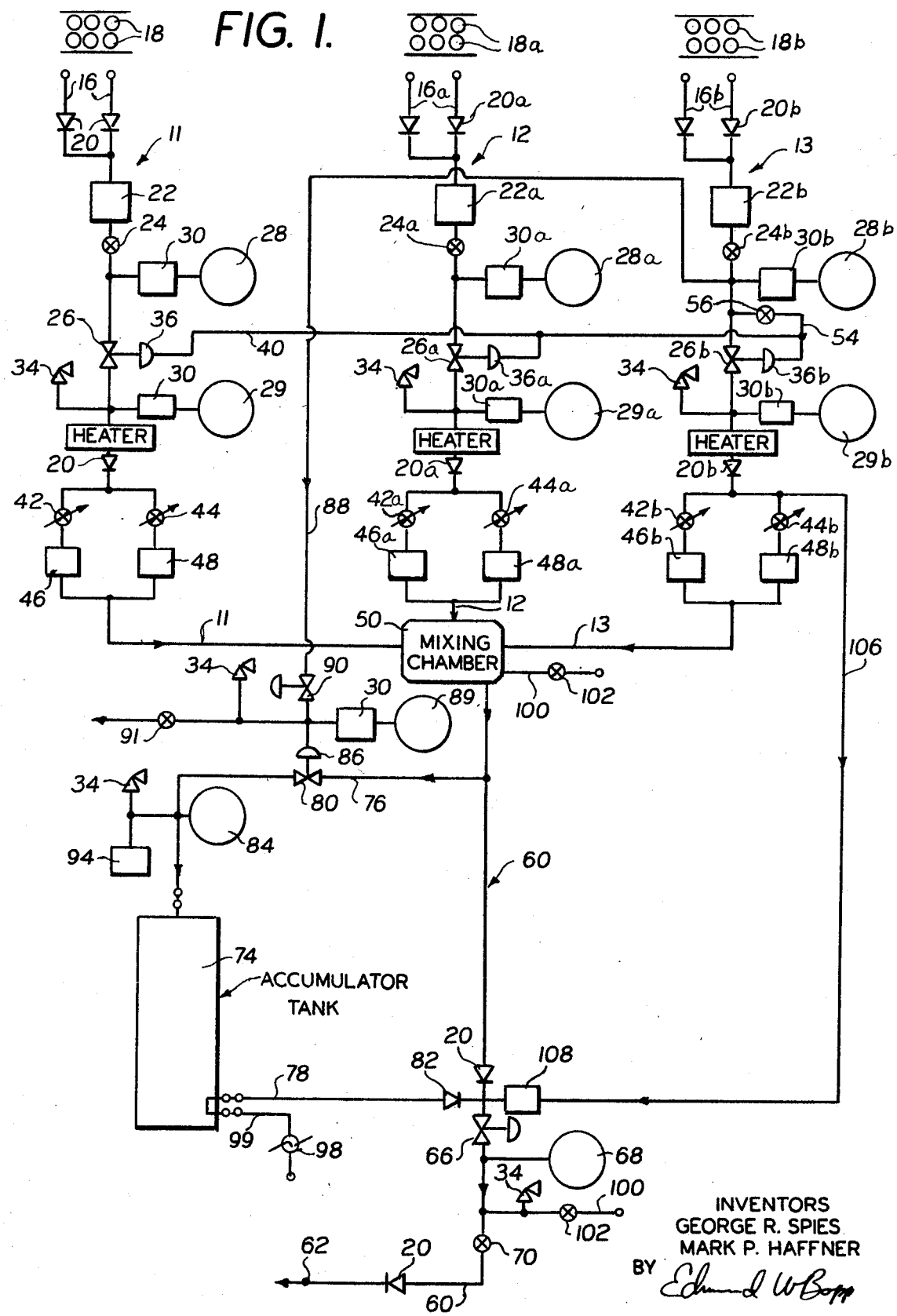
FIG. 1 is a diagrammatic view showing a system for incremental proportioning of gases supplied to a mixer and to a delivery line beyond the mixer.

The mixture proportioning system shown in FIG. 1 includes three supply lines 11, 12 and 13. The supply line 11 has connections 16 for putting the supply line in communication with a helium source 18. This source may be storage cylinders in which helium gas is contained. The helium passes through check valves 20 in the connections 16 and these connections 16 lead to a common filter 22. Beyond the filter 22, there is a manually operated shutoff valve 24; and beyond the valve 24 there is a pressure regulator 26 in the supply line. There are preferably gauges 28 and 29 connected with the supply line 11 on both sides of the pressure regulator 26 and a snubber 30 is located between each gauge and its connection to the supply line 11.

There is a relief valve 34 on the supply line 11 downstream from the pressure regulator 26. The pressure regulator 26 is preferably a gas-loaded regulator with a dome 36 to which the loading gas is supplied. In this type of regulator, the delivery pressure depends upon the pressure in the loading dome 36 in the same way as the delivery pressure of most regulators depends upon the pressure of the loading spring. Gas for loading the dome 36 is supplied through a gas pressure pipe 40 which receives its gas from one of the other supply lines, for reasons which will be explained later.

The supply line 11 contains a plurality of metering valves 42 and 44. These metering valves are connected in parallel with one another. They are adjustable to change their flow capacities. Only two metering valves 42 and 44 are shown in the drawing, but any number of metering valves can be connected in parallel in the supply line 11, depending upon the number of different flow rates that it is desirable to obtain from the supply line 11. Although the elements 42 and 44 are referred to as "metering valves," because they are adjustable to control the rate of flow, it will be understood that the term "metering valve" is used in a broad sense to include also orifices which control flow but which are not adjustable.

There is a solenoid-operated shutoff valve 46 in series with the metering valve 42, and a corresponding solenoid-operated shutoff valve 48 in series with the metering valve 44. These valves 46 and 48 are merely representative of shutoff valves which can be operated remotely by supplying power to their electric motor means.

Beyond the shutoff valves 46 and 48, the parallel branches of the supply line 11 come together in a single line which leads to a mixing chamber 50.

In a further refinement of this mixing system, it has been found that if regulated heat exchangers are placed in the supply lines upstream of the metering valves, so that the temperature of the gases entering the valves can be controlled under optimum conditions, the gases can be at the same temperature and therefore reduce the small effect upon mixture stability that temperature variation between streams can cause. The heat exchangers are shown schematically in FIG. 1.

The supply line 12 has elements similar to those of the supply line 11 and they are indicated in the drawing by the same reference characters with an "a" appended. This supply line 12 also leads to the mixing chamber 50. The supply line 12 is connected with a nitrogen source 18a.

The supply line 13 also contains the same elements as the supply line 11 and they are indicated by the same reference characters with a letter "b" appended. This supply line 13 is connected with an oxygen source 18b and has its downstream end connected with the mixing chamber 50.

The gas pressure pipe 40, which supplies gas to the loading domes of the regulators 26, 26a and 26b, is connected with the oxygen supply line 13 by piping 54 commanded by a valve 56. This valve 56 is normally closed but can be turned in one direction to connect the supply line 13 with the gas pressure pipe 40 to increase the gas pressure in the loading domes 36, 36a and 36b; or can be turned into another position to permit gas to escape from the loading domes, depending upon whether the regulators 26, 26a and 26b are to be adjusted for higher or lower delivery pressure.

Since all of the domes 36, 36a and 36b are loaded, or their pressure reduced, through the common gas pressure pipe 40, the delivery pressure of all of the regulators 26, 26a and 26b changes by the same amount when the pressure of any one of them is changed, due, for example, to temperature change, leakage, etc. The importance of this feature is that the proportioning of the gases supplied to the mixing chamber 50 would be changed by changes in the upstream pressure of the metering valve in one supply line which did not occur by an equal amount in the other supply line. Dome loading could also be accomplished with the use of an independent pressure source. The oxygen supply is used in our embodiment due to its convenience and availability.

On the downstream side of the mixing chamber 50, there is a delivery line 60 which leads to the user of the mixed gas, and in FIG. 1 the delivery line 60 is shown with an outlet 62 for connection with a hose to a diver's helmet. However, the mixture can be used for any other purpose, such as certain chemical or medical processes, where gas atmospheres of definite proportions are required. The specific gases mentioned are only illustrative of the many types of gases that may be mixed using this system.

There is a pressure regulator 66 in the delivery line 60 for reducing the pressure at which the mixed gases are supplied to the user. There are also check valves 20 at appropriate locations in the delivery line. A gauge 68 indicates the pressure in the delivery line 60 downstream from the pressure regulator 66 and there is a shutoff valve 70 which remains open whenever the system is in operation.

A gas accumulator tank 74 is connected in parallel with a portion of the delivery line 60. This connection is made by piping 76 leading from the delivery line 60 to the upstream end of the accumulator tank 74, and other piping 78 leading from the downstream end of the accumulator tank 74 back to the delivery line 60 at a low location between a check valve 20 and the upstream end of the pressure regulator 66. A back pressure control valve 80 is located in the piping 76; and a check valve 82 is connected in the piping 78. A pressure gauge 84 indicates the gas pressure in the accumulator tank.

The back pressure control valve 80 is preferably of the dome-loaded type and has a loading dome 86 which receives gas from a gas pressure pipe 88 connected with the oxygen supply line 12. The dome pressure is indicated by a gauge. A pressure regulator 90 controls the pressure of gas supplied to the loading dome 86. A valve 91 controls a small bleed flow from the loading dome 86 to the atmosphere, thereby contributing to the accuracy of the pressure regulator 90.

The back pressure control valve 80 acts as a continuously throttling relief valve which controls the back pressure on the mixing chamber 50 and on all of the metering valves in the supply lines 11, 12 and 13 by preventing flow of gas through the piping 76 until the pressure reaches a predetermined value. For example: the back pressure control valve 80 may be loaded so that any pressure in excess of 400 pounds per square inch can escape through the piping 76 into the accumulator tank 74; but as long as the pressure in the delivery line 60 and in the mixing chamber 50 is less than 400 pounds per square inch, no gas can flow from the delivery line 60 into the accumulator tank 74. The check valve 82 prevents flow from the delivery line 60 toward the tank 74 at all times.

There is a pressure-responsive switch 94 connected with the piping 76 on the downstream side of the back pressure control valve 80. This pressure-responsive switch 94 can be connected directly to the tank 74, if desired, since its function is to open and close circuits in accordance with variations in the gas pressure in the tank 74.

The capacity of the supply lines 11, 12 and 13 is substantially greater than the demand for which the system is intended. As a result, pressure in the delivery line 60 builds up until it exceeds the pressure for which the control valve 80 is set, for example: 400 pounds per square inch, this value being given merely by way of illustration. When the pressure exceeds 400 pounds per square inch, gas flows through the control valve 80 into the accumulator tank 74 and the pressure in the accumulator tank increases until it reaches a value which operates the pressure-responsive switch 94. This switch is preferably adjusted to operate at substantially the same pressure at which the control valve 80 operates. The increase in pressure in the tank 74 can be used either to open or close the switch 94, but in any event, the operation of the switch 94 by pressure increase in the tank 74, controls circuits which close any of the shutoff valves 46, 48, 46a, 48a, 46b and 48b, which happen to be open. In the preferred construction shown in the drawing, and more particularly shown in FIG. 2, the shutoff valves in the supply lines are opened when their solenoids are energized and the pressure in the accumulator tank 74 opens the switch 94 so as to shut off power to the solenoid-operated valves which are in series with the metering valves of the supply lines 11, 12 and 13.

With continued demand for gas from the delivery line 60, gas is supplied from the accumulator tank 74 because the supply of gas to the mixing chamber 50 is shut off. Pressure in the accumulator tank 74 decreases and when it drops to a predetermined value, the pressure-responsive switch 94 operates to close the electric circuits to the solenoid-operated valves and gas is again supplied to the mixing chamber in the same proportions as before. Pressure builds up substantially instantaneously in the delivery line 60 until the pressure control valve 80 opens to permit flow into the accumulator tank 74 and the cycle is repeated. The pressure-responsive switch can be a single switch of conventional construction for operation in response to gas pressure, or it can be a composite construction with different switch contacts supplied by duplicating the single switch or by equivalent structure.

If the system is being used to supply a breathing atmosphere to a diver, it is desirable to change the proportions of the different gases as the diver moves to different depths. This is done by using different combinations of metering valves in the different supply lines 11, 12 and 13 and is done automatically by apparatus which will be described in connection with FIG. 2. For the present, it is sufficient to understand that at certain times, the proportions of gases supplied to the mixing chamber 50 may be changed and it may be desirable to have these changes available to the user promptly without waiting to use up the accumulated gas mixture in the tank 74.

When such is the case, the accumulator tank 74 can be dumped substantially instantaneously by opening a normally closed dump valve 98 which communicates with the tank 74 through piping 99. It is a feature of the invention that the gas in the tank 74 can be released through the dump valve 98, bringing the accumulator tank 94 to atmospheric pressure without affecting the demand pressure, that is, the pressure in the delivery line 60. This is possible because of the back pressure control valve 80 and the check valve 82. As soon as the pressure of the gas with the new proportions builds up the delivery line pressure above the operating pressure of the control valve 80, the accumulator 74 will receive a new charge of gas with the new constituent proportions.

Taps 100 are provided at various locations for withdrawing mixed gases in order to test samples for correct proportioning. These taps are controlled by shutoff valves 102 in the conventional manner.

It is sometimes desirable to supply oxygen unmixed with other gases. For this reason, the system shown in FIG. 1 is equipped with an oxygen by-pass line 106 connected with the delivery line 13 between the pressure regulator 26b and the metering valves 42b, 44b. This oxygen by-pass line connects with the delivery line 60 on the upstream side of the pressure regulator 66. It is commanded by a solenoid-operated valve 108. The oxygen by-pass line operates independently of the accumulator tank 74 because there is a check valve 20 in the delivery line in position to prevent oxygen from the by-pass line 106 from flowing back through the delivery line to the piping 76 which leads to the accumulator tank 74.

Figure 2:
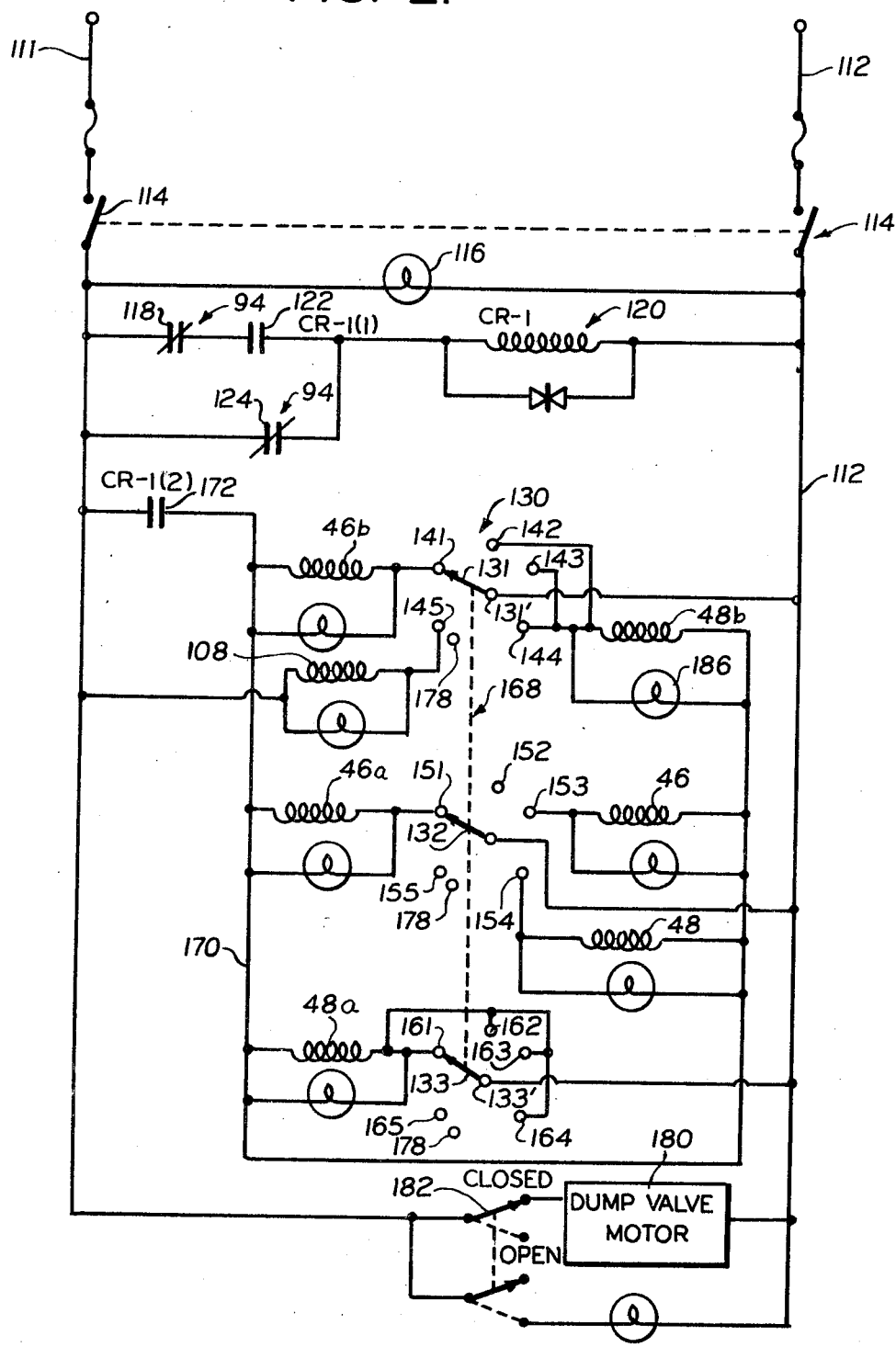
FIG. 2 is a wiring diagram for the system shown in FIG. 1.

FIG. 2 is a wiring diagram for the system shown in FIG. 1. Power is supplied to the system through conductors 111 and 112. There is a master switch 114 for connecting and disconnecting the system and the power line. A lamp 116 is connected across the switch 114 and is energized when the switch 114 is closed.

The pressure-responsive switch 94 has switch contacts 118 connected on one side with the conductor 111. The other side of the switch 94 is connected in series with the operating coil of a control relay (CR–1) which is connected on its other side with the conductor 112. The control relay 120 (CR–1) has switch contacts 122 (CR–1(1)) which open and close the circuit that connects the switch 94 with the operating coil 120. The pressure-responsive switch 94 has other contacts 124 in a shunt circuit that by-passes the contacts 118 and 122 and that connects with the operating coil of the relay 120.

The contacts 118 are closed when the pressure in the accumulator tank is below a limit pressure; for example: 400 pounds per square inch, referred to in the description of the operation of the system shown in FIG. 1. At this limit pressure, the pressure-responsive switch 94 opens the contacts 118. Thus these are the high limit contacts of the switch 94. Conversely, the contacts 124 are open when the pressure in the accumulator tank is above a minimum pressure to which the accumulator pressure is allowed to fall; and when the pressure in the tank drops to this minimum pressure, the switch 94 closes its contacts 124. They are, therefore, the low limit contacts of the switch 94.

From the wiring diagram it is apparent that closing of the switches 124 energizes the coil of the relay 120. After this relay 120 is energized and has closed its contacts 122, the relay 120 remains energized through contacts 118 and 122 until the switch 94 opens the high element contacts 118.

There is a master control switch 130 consisting of three brushes 131, 132 and 133. Each of these brushes is connected with a center contact 131′, 132′ and 133′, respectively, and the brush rotates about its center contact. All of these center contacts are connected with the power line 112.

There is a circle of five contacts 141–145 around the center contact 131′. These contacts 141–145 are shown located at equal angular spacing around the center, and the brush 131 touches each of the contacts 141–145 as it is rotated about its center contact 131′.

There is another circle of five contacts 151–155 around the center contact 132′ and with angular spacings similar to that of the contacts 141–145. The brush 132 touches these contacts 151–155 successively as it is rotated; similarly, there is a circle of contacts 161–165 around the center contact 133′, in position to be touched by the brush 133 as it is rotated about its center. The brushes 131, 132 and 133 are rotated in unison by a contact actuator 168 that is connected with all of the brushes.

The brushes 131, 132 and 133 which are the movable contacts of the master control switch 130, serve to complete the circuits of the various solenoid shutoff valves 46, 46a, 48, 48a, 46b and 48b which are connected on one side with certain of the contacts 141–145; 151–155 and 161–165, and on the other side with a conductor 170 which connects with the power line 111 when the relay coil 120 is energized and its contacts 172 (CR–1(2)) are closed.

With the brushes 131, 132 and 133 in the position shown in FIG. 2, the solenoid-operated shutoff valves 46b, 46a and 48a are energized and open, and the gases supplied to the mixing chamber are nitrogen and oxygen only with both of the nitrogen metering valves open so that the system supplies its maximum nitrogen content for the gas mixture. Operation of the brushes 131, 132 and 133 into positions to touch the five successive contacts produces the following results:

| Contacts | Valves open | Gas supplied |
| --- | --- | --- |
| 141 | 46b | O |
| 151 | 46a | N |
| 161 | 48a | N |
| 142 | 48b | N |
| 152 | | |
| 162 | 48a | O |
| 143 | 48b | N |
| 153 | 46 | He |
| 163 | 48a | O |
| 144 | 48b | N |
| 154 | 48 | He |
| 164 | 48a | O |
| 145 | 108 | O |
| 155 | | |
| 165 | | |

When the actuator 168 moves the brushes 131, 132 and 133 to the dead points 178, the sysem is shut off because none of the circuits of the solenoid-operated valves 46, 48, 46a, 48a, 46b and 46b are closed through the master control switch 130. The valve 108 is connected with the power line 111 independently of the contacts 172 of the control relay 120; and so is the power supply line to a motor 180 that operates the dump valve 98, but there is a momentary contact switch 182 for completing the circuit to the motor 180. When the switch 182 has its contacts closed, as shown in FIG. 2, the motor 180 closes the dump valve 98, but when the switch 182 is moved into the dotted-line position, the mirror 180 opens the dump valve 98.

Figure 3:
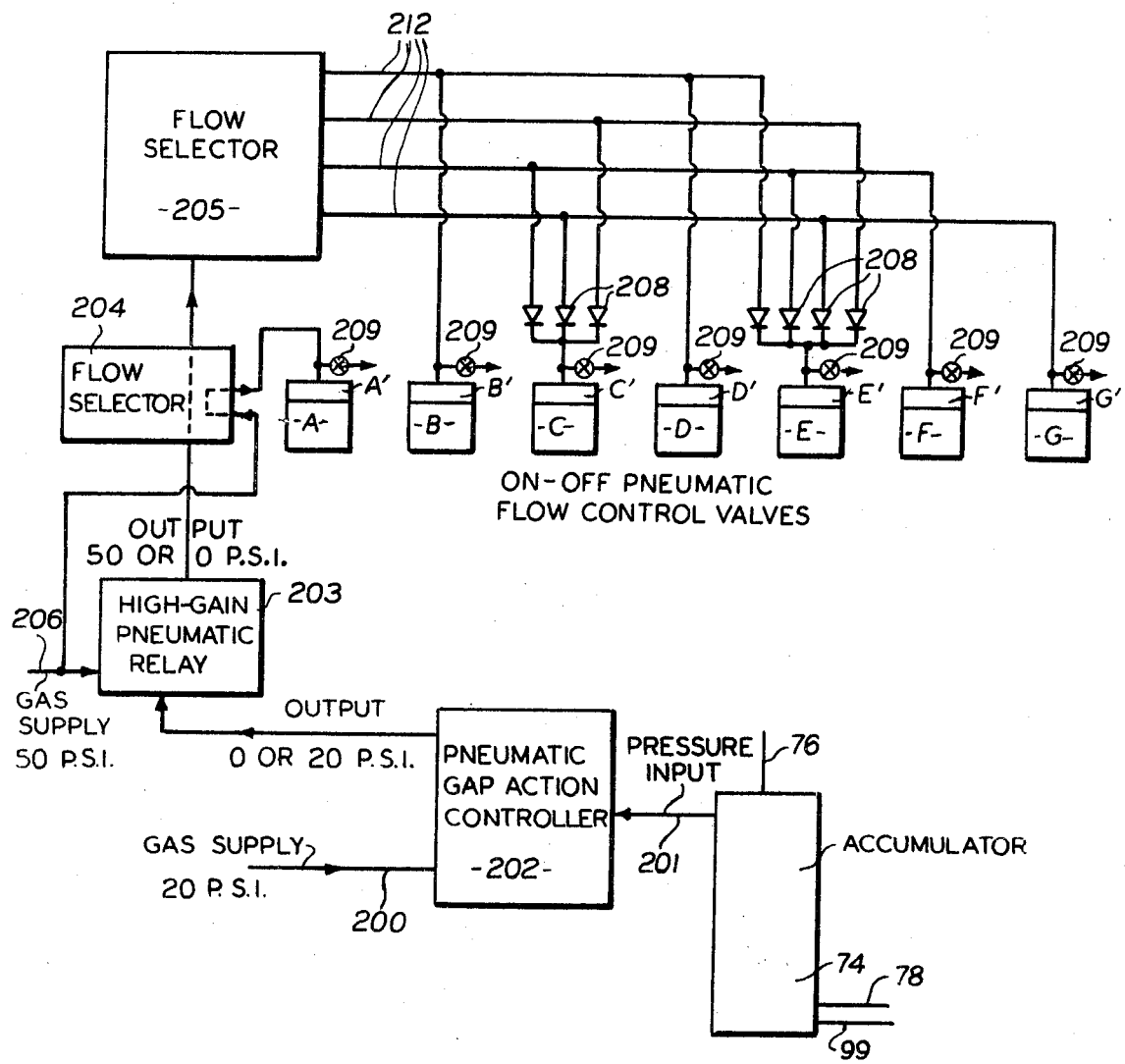
FIG. 3 is a piping diagram for a modified construction in which the valves are controlled pneumatically instead of electrically.

In a further embodiment of the invention which is depicted in part in FIG. 3, shutoff valves B–G, corresponding to valves 46, 48, 46a, 48a, 46b and 48b in FIG. 1, are controlled by means of a pneumatic control system and operated by pneumatic motors B'–G'. This type of system has a decided advantage over an electrical control system in that no electric power supply is necessary. The various control mechanisms may be powered by a bleed from one of the gases being mixed or from a separate source. In FIG. 3 there is illustrated a pneumatic system in which the pressure in the accumulator 74 is transmitted to a pneumatic gap action switch or controller 202 through a conduit 201. The operation of the controller 202 is analogous to the operation of the pressure-responsive electrical switch 94 and associated electrical circuitry in FIG. 1. The controller is responsive to sensing predetermined high and low limits in the accumulator and transmits an output signal to either close or open the preselected shutoff valves A–G. When the pneumatic gap action controller senses a pressure in the accumulator either equal to or less than its lower pressure setting, it transmits an output signal to the high-gain pneumatic relay 203. The relay amplifies the signal and it is transmitted to a series of flow selectors 204, 205, which direct the signal to the aforementioned shutoff valves A through G. These valves control the flow of gas to the mixing chamber as hereinabove described, which in turn pressurizes the accumulator. When the accumulator pressure reaches the high limit set in the gap action controller, the controller ceases to send an output signal. The gap action controller does not transmit an output signal again until the accumulator pressure reaches the low limit set in the controller. In FIG. 3, the output of the pneumatic gap action controller is depicted as either 0 or 20 p.s.i., and the gas supplies for the high-gain pneumatic relay 203 and the pneumatic gap action controller 202 are indicated as 50 p.s.i. and 20 p.s.i., respectively. These pressures may, of course, be selected in order to meet the needs of a particular system. This is merely illustrative. As mentioned above, the signal is first transmitted to a high-gain pneumatic relay 203 where it is amplified and sent to the first of a series of flow selectors. The first selector 204 has two operative positions, one of which provides for the supply of straight oxygen by allowing the supply gas 206 to reach and activate valve A, and the other of which allows the aforementioned output signal to enter the second flow selector 205. Both the flow selectors may be of the ported valve variety, either rotary or sliding. The flow selector 205 illustrated, can be set in any of four positions to control the valves B–G in the manner desired. In this embodiment, the valves are activated by pneumatic motors. Note that the valves C and E in the arrangement shown must have check valves 208 associated therewith to prevent the signal from backing up in other fluid-transmitting lines 212. Bleed valves 209 are also connected to the conduits leading into the motors A'–G'. These valves have orifices which allow the pressures in the said motors to reduce when the valves are deactivated. The orifices are made sufficiently small so that they do not affect the operation of the motors on activation. Any number of valves and combinations of valves may be used in conjunction with a suitable flow selector to create the mixture desired. Both the pneumatic gap action controller 202 and the high-gain pneumatic relay 203 are powered by a supply of gas, through conduits 200 and 206. This supply can be taken from any of the gases being mixed or from a separate source. The control mechanisms in the pneumatic system are shown diagrammatically and any known control mechanism which will perform the desired functions can be used.

The mixing system which is described above can be used not only in supplying gases for life-supporting environments, but for supplying gases to any facility, such as a chemical or medical operation which has need of such a supply.

The preferred embodiments of the invention have been illustrated and described, but changes and modifications can be made and some features can be used in different combinations without departing from the invention as defined in the claims.

What is claimed is:

1. A mixture proportioning system for gases including in combination a plurality of supply lines for different gases, each supply line including pressure regulator means, a metering valve, and a shutoff valve, a mixing chamber to which all of the supply lines are connected at their downstream ends, a delivery line for supplying mixed gas from the mixing chamber to a region at which the mixed gases are used, an accumulator tank connected in parallel with at least a part of the length of the delivery line, and means responsive to the gas pressure in the accumulator for closing the shutoff valves when the accumulator pressure reaches a predetermined value.

2. The mixture proportioning system described in claim 1 characterized by electric motor means for opening and closing the shutoff valves, the means responsive to the gas pressure in the accumulator being an electric switch with an actuator that is operated by the pressure in the accumulator, other switch means responsive to the pressure in the accumulator for opening the shutoff valves when gas pressure in the accumulator drops below a given value.

3. The mixture proportioning system described in claim 1 characterized by the metering valves in each supply line being on the downstream side of the pressure regulator means of that supply line, another pressure regulator means that maintains a constant pressure in the supply lines downstream from the metering valves at a value less than the delivery pressure of the upstream regulator of the respective supply lines, but at a value correlated with the regulator means delivery pressures of the supply lines to produce a pressure drop across the metering valves less than the critical orifice flow pressure drop for the gas in the respective supply lines.

4. The mixture proportioning system described in claim 1 characterized by a gas outlet through which gas can escape from the accumulator, other than the delivery line, a dump valve commanding said gas outlet, means for operating the dump valve to exhaust the gas from the accumulator preparatory to use of the system with a different gas mixture, and valves in the parallel connection of the accumulator to the delivery line in positions to prevent escape of gas from the delivery line through the dump valve.

5. The mixture proportioning system described in claim 1 characterized by the pressure regulator means in each of the gas supply lines being a gas-loaded regulator, and the regulators of all of the gas supply lines being supplied with loading gas from the same source of gas pressure whereby any change in the loading pressure on the regulator in one supply line occurs in equal magnitude in the regulator in the other supply lines.

6. The mixture proportioning system described in claim 5 characterized by sources of different kinds of gas including a source of helium connected with one of the supply lines, a source of nitrogen connected with another of the supply lines, a source of oxygen connected with another of the supply lines, and means connecting the regulators of all of the supply lines with the oxygen supply line as a source of gas pressure for loading the regulators.

7. The mixture proportioning system described in claim 1 characterized by a plurality of metering valves connected in parallel with one another in each of the supply lines, and a shut-off valve for each of said metering valves, the different metering valves in each supply line having different flow capacities.

8. The mixture proportioning system described in claim 7 characterized by electric motor means for opening and closing the different shutoff valves, master control switch means including a contact actuator movable into a plurality of different positions, and circuits leading from the master control switch means to each of the shutoff valve motor means, said circuits having contacts in the master control switch means in different positions where the contact actuator closes different combinations of said circuits as it is moved into different positions.

9. The mixture proportioning system described in claim 7 characterized by motor means for opening and closing the different shutoff valves, master control means for supplying working fluid to the motor means including a selector and a plurality of connections between the selector and the motor means through which working fluid flows to the motor means, the different connections leading to different motors and groups of motors, a supply line that brings working fluid to the selector, and means for moving the selector to different positions to establish selective communication between the working fluid supply line and the different connections to the motor means whereby different motors and groups of motors open the valves of various gas supply lines to control the gas mixture.

10. The mixture proportioning system described in claim 9 characterized by the motor means being pneumatic motors and the selector including valve means with different ports communicating with fluid flow conduits which are the connections between the selector and the motor means, and check valves for preventing back flow through the conduits which communicate with motors that also have other conduits communicating with them.

11. The mixture proportioning system described in claim 1 characterized by means for changing the rate of discharge of the different metering valves.

12. The mixture proportioning system described in claim 1 characterized by one of the supply lines being for oxygen, and a by-pass line leading from the oxygen supply line, at a location upstream from the metering valve and shutoff valve of the oxygen supply line, to the delivery line, and means to control the flow in said by-pass line.

13. The mixture proportioning system described in claim 1 characterized by the system being for supplying a breatthing gas mixture to a diver, there being three supply lines, one for helium, one for nitrogen and the other for oxygen, the pressure regulator means in each supply line being a dome-loading regulator and the dome space for all the regulators being supplied with gas from the oxygen supply line upstream from the regulator in the oxygen supply line, each of the supply lines having a plurality of metering valves connected in parallel with one another on the downstream side of the pressure regulator in that supply line and each of the metering valves being adjustable to change its flow rate, a different shutoff valve in series with each of the metering valves of each supply line, an operating solenoid for each of the shutoff valves, a back pressure control valve between the delivery line and the upstream end of the accumulator, said back pressure control valve being operative to pass mixed gas, exceeding a predetermined pressure, from the delivery line to the accumulator, said predetermined pressure being correlated with the delivery pressure of the pressure regulators in the supply lines to obtain sub-critical metering between fixed pressure limits across the metering valves, a check valve between the delivery line and the downstream side of the accumulator for preventing gas in the delivery line from flowing to the accumulator, the means responsive to the gas pressure in the accumulator being an electric switch with an actuator that is operated by the pressure in the accumulator, other switch means responsive to the pressure in the accumulator for opening the shutoff valves when the gas pressure in the accumulator drops below a given value, and control switch means operable to open different combinations of said shutoff valves to change the rate of flow of the different gases to the mixture chamber.

14. The mixture proportioning system described in claim 13 characterized by the flow rates of all of the different combinations of metering valves being greater than the demand at the user's end of the delivery line so that pressure in the delivery line repeatedly builds up to a value to change the accumulator.

15. A method of proportioning and mixing a plurality of gases which comprises supplying separate streams of constituent gases, establishing an upper pressure level and a lower level in each of said streams such that sub-critical flow occurs, controlling the rate of flow of each stream in accordance with the desired proportion of that gas in the mixture, intermixing said streams, storing at least part of said mixed gases under pressure in an accumulator and regulating the supply of constituent gases dependent on the pressure in the accumulator.

16. A method of mixing gases to obtain desired proportions comprising the steps of supplying separate streams of constituent gases, regulating the pressure in each of said streams to a first desired pressure, metering the flow of said streams of gas, mixing said streams of gas and regulating the pressure of said mixture so that said pressure does not exceed a second desired pressure which is lower than said first desired pressure in each of said streams, maintaining said second desired gas mixture pressure by venting pressure in excess of said second desired pressure and storing the gas so vented in an accumulator.

17. The method of claim 16 characterized by metering the flow of said streams subcritically between said first desired pressure in each of said streams and said second desired pressure.

18. The method of claim 17 characterized by regulating the temperature of each of said streams prior to metering said streams.

19. The method of claim 17 characterized by adjusting the metering to obtain the desired proportions in the mixture of gases.

20. The method of claim 17 characterized by interconnecting the regulation of the pressures in each of said streams so that variations in the pressure in one stream is reflected by comparable variations in pressure in any other stream.

21. The method of claim 16 characterized by maintaining the pressure in said accumulator between predetermined pressure limits, terminating the flow in said streams when said accumulator pressure reaches its upper pressure limit.

22. The method of claim 21 characterized by delivering the mixture from said accumulator to a demand until the pressure in said accumulator reaches its lower pressure limit, and then commencing the flow in said streams to restore the pressure in said accumulator.

23. The method of claim 22 characterized by dumping the contents of the accumulator without interrupting the supply to the demand when the demand requires a gas mixture of different proportions than that stored in the accumulator, adjusting the metering to obtain new desired proportions and delivering the new mixture to the demand without interruption.

24. The method of claim 16 characterized by supplying said mixture to a life supporting environment.

25. The method of claim 24 characterized by said constituent gases comprising separate streams of oxygen, nitrogen and helium.

26. The method of claim 24 characterized by said life supporting environment being located underwater, adjusting the metering of the flow of said streams of gas to supply said life supporting environment with the necessary proportions of said gases dependent on the depth of said environment.

27. The method of claim 16 characterized by supplying said mixture to an underwater diver for breathing purposes, adjusting the metering of the flow of said streams of gas to supply said diver with a breathing gas mixture of proper proportions for the depth of immersion of the diver.

28. The method of claim 27 characterized by said constituent gases comprising streams of oxygen, nitrogen and helium.

29. A method of delivering a desired mixture of gases to a life-supporting environment comprising the steps of supplying separate gaseous streams of constituent gases comprising oxygen, nitrogen and helium at about the same pressure, metering the flow of each of said streams, maintaining said metered streams at a constant predetermined pressure lower than said first pressure, mixing said streams, directing said mixture to said environment at a desired pressure, and adjusting the metering of said streams to supply said life-supporting environment with the desired mixture of gas.

30. The method of claim 29 in which the life-supporting environment is located underwater, adjusting the metering of the flow of said streams to supply said environment with the necessary proportions of said gases dependent on the depth of said environment.

31. The method of claim 29 characterized by maintaining said constant predetermined pressure by venting pressure in excess thereof and storing the gas so vented in an accumulator, directing said stored mixture to said environment on demand.

32. A mixture proportioning system for supplying a gas mixture to a use point comprising, a plurality of supply means for supplying a plurality of constituent gas streams, means to regulate the pressure of each of said gas streams to a predetermined delivery pressure, metering means to meter the flow of said gas streams, means to maintain a predetermined constant back pressure lower than said delivery pressure on said metering means and means to mix said streams to form a substantially uniform gas mixture, means to deliver said mixture to a use point, accumulator means in parallel relationship with said delivery means, said back pressure maintaining means delivering pressures in excess of said back pressure to said accumulator means, means to dump said accumulator means without affecting the pressure in said delivery means.

33. The mixture proportioning system of claim 32 having means to supply the gas mixture to a life supporting environment.

34. The mixture proportioning system of claim 32 having means to supply the gas mixture to a hyperbaric environment.

35. The mixture proportioning system of claim 32 further comprising pressure regulating means associated with said accumulator means to maintain the pressure in said accumulator means within predetermined pressure limits.

36. The mixture proportioning system of claim 35 in which said pressure regulating means comprises valve means controlling the flow of said gas streams.

37. The mixture proportioning system of claim 36 in which said pressure regulating means employs an electrically powered system to control said valve means.

38. The mixture proportioning system of claim 36 in which said pressure regulating means employs a pneumatically powered system to control said valve means.

39. The system of claim 32 in which said metering means comprises a plurality of metering valves arranged in parallel in each of said gas streams.

40. The system of claim 32 in which the means to regulate the pressure of each of said gas streams comprises a pressure regulator in each of said streams, means interconnecting said regulators to insure that a variation in pressure in one gas stream is reflected by a compensating pressure variation in any other stream.

41. The mixture proportioning system of claim 32 characterized by said constituent gas stream comprising oxygen, nitrogen and helium.

References Cited

UNITED STATES PATENTS

| | | | |
|---|---|---|---|
| 3,173,483 | 3/1965 | Brandt et al. | 137—87 X |
| 3,351,089 | 11/1967 | Garrahan | 137—599 |
| 2,707,964 | 5/1955 | Monroe | 137—7 X |
| 3,103,228 | 9/1963 | Davenport | 137—98 |

LEONARD D. CHRISTIAN, Primary Examiner

U.S. Cl. X.R.

137—87, 207

UNITED STATES PATENT OFFICE
CERTIFICATE OF CORRECTION

Patent No. 3,515,155　　　　　　　　　Dated　June 2, 1970

Inventor(s)　Mark P. Haffner and George R. Spies

It is certified that error appears in the above-identified patent and that said Letters Patent are hereby corrected as shown below:

Column 1, line 68, "subscritically" should read --subcritically--.

Column 6, line 62, second occurrence of "46b" should read --48b--.

Column 6, line 71, "mirror" should read --motor--.

Column 9, line 38, "breatthing" should read --breathing--.

Column 9, line 65, the hyphen is missing after "pres".

Column 10, line 2, "change" should read --charge--.

Column 12, line 27, "stream" should read --streams--.

SIGNED AND SEALED
SEP 29 1970

(SEAL)
Attest:

Edward M. Fletcher, Jr.
Attesting Officer

WILLIAM E. SCHUYLER, JR.
Commissioner of Patents